United States Patent [19]
Allinquant et al.

[11] 4,055,352
[45] Oct. 25, 1977

[54] SEALING MEANS FOR A LONGITUDINALLY DISPLACEABLE ROD

[76] Inventors: Fernand Michel Allinquant, 53, Avenue Le Notre; Jacques Gabriel Allinquant, 12, Avenue Arouet, both of 92330 Sceaux, France

[21] Appl. No.: 676,512

[22] Filed: Apr. 13, 1976

[30] Foreign Application Priority Data
Apr. 18, 1975 France .................. 75.12133

[51] Int. Cl.² .................................. F16J 15/32
[52] U.S. Cl. .................... 277/152; 277/212 C
[58] Field of Search ............. 277/27, 152, 212 C, 277/47, 51, 52, 212 FB, 37

[56] References Cited
U.S. PATENT DOCUMENTS

| | | | |
|---|---|---|---|
| 2,838,333 | 6/1958 | Wilder et al. | 277/51 |
| 3,099,454 | 7/1963 | Walinski | 277/47 |
| 3,738,665 | 6/1973 | Bilco | 277/27 |
| 3,741,615 | 6/1973 | Otto | 277/37 |

Primary Examiner—Richard E. Aegerter
Assistant Examiner—L. Footland
Attorney, Agent, or Firm—Staas & Halsey

[57] ABSTRACT

Sealing means for a longitudinally displaceable rod forming part of, for example, an aircraft undercarriage, comprises a flexible annular sealing element having a skirt which is folded back to define a toroidal cavity which receives fluid under pressure to press a lip of the sealing element into fluid-tight engagement with the rod.

3 Claims, 2 Drawing Figures

U.S. Patent  Oct 25, 1977  4,055,352
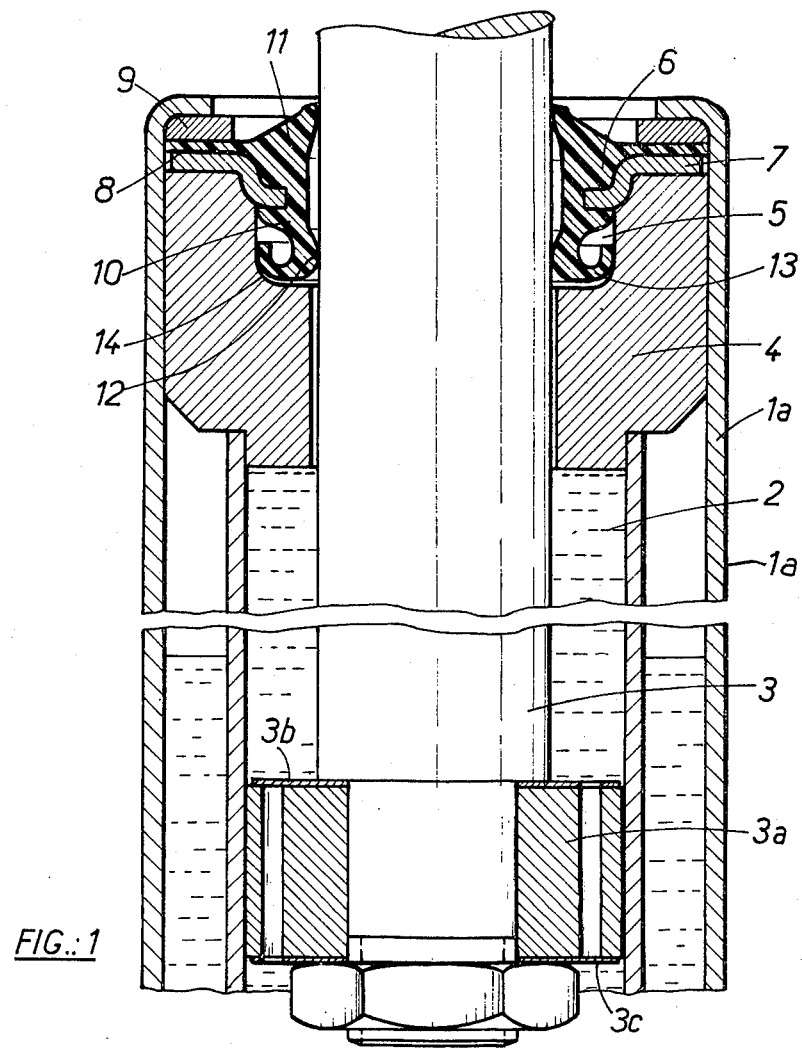
FIG.:1
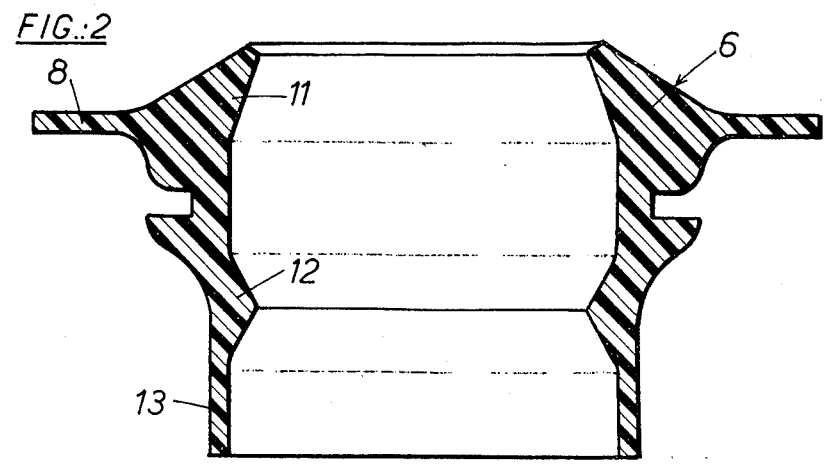
FIG.:2

SEALING MEANS FOR A LONGITUDINALLY DISPLACEABLE ROD

This invention relates to sealing means for a longitudinally displaceable rod extending from a zone under pressure and the objects of the invention include the provision of sealing means the effectiveness of which increases upon an increase in the pressure of said zone relative to its surroundings.

According to the invention, the rod passes through a flexible annular sealing element a part of which is bent or folded back to form a cavity which receives fluid under pressure, said cavity being so positioned that the pressure of the fluid urges the sealing element into engagement with the rod.

The invention will now be described by way of example with reference to the accompanying drawings which illustrate an embodiment of sealing means for a hydraulic shock absorber, this being a preferred application of the invention. In the drawings:

FIG. 1 is an axial sectional view of the upper part of a hydraulic shock absorber which includes two coaxial tubes, and FIG. 2 is a sectional view of a sealing element forming part of the shock absorber prior to incorporation of the sealing element in the shock absorber.

The shock absorber includes a rod 3 that is axially reciprocable within a tube 1 filled with a liquid 2, for example, oil. The rod 3 carries a piston 3a formed with a plurality of passages so that movement of the rod 3 and piston 3a causes displacement of the liquid through the passages which are controlled by valves shown schematically in FIG. 1 and comprising thin steel sheets 3b and 3c.

At the upper end of the tube 1, there is a guide member 4 which surrounds the rod 3 and is formed of an anti-friction metal in order to facilitate sliding of the rod 3. An annular cavity 5 is provided at the outer end of the guide member 4, i.e. the end thereof remote from the zone containing the liquid under pressure. A sealing element 6 of an elastomeric material is supported on the guide member 4 by means of a metallic washer 7 which is of dished form so as to obtain adequate rigidity without having to increase the thickness of a washer 7. The washer 7 is intended to act as a strengthening member for the whole of the elastic mass of the sealing element 6 which has a thin flange 8 thermally bonded to the outwardly facing surface of the washer 7.

An outer washer 9 of annular form rests on the flange 8 and is pressed against the flange 8 to effect compression thereof in order to obtain a peripheral fluid-tight seal between the sealing element 6 and the outer tube 1a of the shock absorber. The diameter of the flange 8 is sufficient to obtain this sealing action. Pressing of the outer washer 9 into engagement with the flange 8 is obtained, in the particular embodiment shown in FIG. 1, by bending over the end portion of the outer tube 1a. In an alternative arrangement (not shown), a screw-threaded element is provided which engages the outer tube 1a and can be tightened to effect the required compression of the flange 8.

In its free or relaxed state, as shown in FIG. 2, the sealing element 6 is of generally cylindrical form with an external diameter equal to that of the cavity 5, the sealing element 6 having a bore with a diameter which is slightly larger than the diameter of the rod 3. At its upper end, as viewed in the drawings, the sealing element 6 includes an inwardly directed lip 11 which is of frustoconical form and serves as a scraper to remove any particles clinging to the rod 3. The sealing element 6 also includes a second inwardly directed rib 12 having a triangular cross-section which is disposed intermediate the upper and lower ends of the sealing element. The triangular form of the rib 12 provides a frustoconical surface corresponding to the surface of the lip 11 followed by an outwardly flared portion with the lower end of the sealing element 6 provided by a short cylindrical skirt 13.

The normal internal diameter of the rib 12 is less than the diameter of the rod 3 and the arrangement is such that, when the sealing element 6 is fitted on the rod 3, prior to location of the sealing element 6 in the cavity 5, the inner surface of the skirt 13 is spaced from the rod 3. When the rod 3 is moved downwardly so that the sealing element 6 enters the cavity 5, the skirt 13 is bent or turned upwardly away from said rod 3 so as to adopt a toroidal configuration and from an annular chamber, this bending or turning of the skirt 13 being facilitated by the curvate shape of the base 14 of the cavity 5.

When the sealing element 6 is mounted in the manner described above and the rod 3 is reciprocated, a slight leakage tends to occur from the volume of fluid under pressure as a result of the annular clearance between the rod 3 and the guide member 4. The fluid under pressure which enters the cavity 5 acts on the sealing element 6, the inward rib or lip 12 of which is clamped tightly against the rod 3. As the end of the upturned skirt 13 is only lightly biased into engagement with the wall of the cavity 5, the skirt is deflected by the fluid under pressure which enters the toroidal chamber defined by the upturned skirt 13 and is trapped in said chamber. The fluid thus exerts a radially inward gripping force on the sealing element 6, which force acts at the position of engagement of the lip 12 with the rod 3. There is thus obtained a "liquid spring" the gripping of which is dependent on the pressure of the fluid, i.e. is directly proportional to the desired sealing effect; this is of particular advantage since the greater the pressure of the fluid, the more firmly the lip 12 is urged into engagement with the rod 3, thereby increasing the effectiveness of the seal. This is in contrast with prior art devices which include a mechanical screw in which the sealing efficiency decreases when the pressure acting on the sealing lip increases.

The sealing means of the present invention is not only more efficient than known devices but it is also relatively inexpensive, simple to produce and reliable.

We claim:

1. A sealing device for maintaining a liquid seal for a rod mounted in a liquid containing chamber, comprising:

gland means, wherein said gland means is configured to define a concentric cavity;

a resilient sealing element having a main body portion of generally cylindrical form having at one end thereof a relatively short cylindrical skirt which, in use, is bent or turned back to define an annular chamber surrounding one end of said main body portion, and wherein the main body portion has a barrel-shaped inner surface and the skirt is connected to the main body portion by an outwardly flared portion, said main body portion further including an annular inwardly extending lip at a second end thereof remote from said skirt and an annular inwardly extending rib intermediate said lip and said skirt, wherein said lip and said rib have approximately equal normal diameters; and flange means for retaining said sealing means in a fixed position with respect to said gland means and said chamber, wherein said skirt of said sealing means is curved outwardly with respect to said rod and forms an annular chamber within said cavity.

2. A sealing device according to claim 1, wherein the sealing element includes, at the end thereof remote from a zone under pressure, said flange means which is bonded to a supporting washer.

3. A sealing device according to claim 2, wherein means are provided for pressing the flange means into engagement with the supporting washer.

* * * * *